United States Patent
Dogen et al.

(10) Patent No.: US 10,604,653 B2
(45) Date of Patent: Mar. 31, 2020

(54) ACTIVE ENERGY RAY CURABLE HOT MELT SILICONE COMPOSITION, CURED PRODUCT THEREOF, AND METHOD OF PRODUCING FILM

(71) Applicant: Dow Corning Toray Co., Ltd., Tokyo (JP)

(72) Inventors: Ryota Dogen, Chiba (JP); Haruna Yamazaki, Chiba (JP); Shin Yoshida, Chiba (JP); Makoto Yoshitake, Chiba (JP)

(73) Assignee: Dow Toray Co., Ltd., Tokyo (JP)

( * ) Notice: Subject to any disclaimer, the term of this patent is extended or adjusted under 35 U.S.C. 154(b) by 224 days.

(21) Appl. No.: 15/769,335

(22) PCT Filed: Oct. 12, 2016

(86) PCT No.: PCT/JP2016/004557
§ 371 (c)(1),
(2) Date: Apr. 18, 2018

(87) PCT Pub. No.: WO2017/068762
PCT Pub. Date: Apr. 27, 2017

(65) Prior Publication Data
US 2018/0305547 A1 Oct. 25, 2018
US 2020/0048463 A9 Feb. 13, 2020

(30) Foreign Application Priority Data

Oct. 19, 2015 (JP) .................. 2015-205945

(51) Int. Cl.
| | | |
|---|---|---|
| C08L 83/08 | (2006.01) | |
| C09J 183/04 | (2006.01) | |
| C08G 81/00 | (2006.01) | |
| B29C 43/30 | (2006.01) | |
| C08G 75/045 | (2016.01) | |
| C08K 5/00 | (2006.01) | |
| C08L 83/00 | (2006.01) | |
| B29C 35/08 | (2006.01) | |
| C08J 5/18 | (2006.01) | |
| C08G 77/20 | (2006.01) | |
| C08G 77/28 | (2006.01) | |
| C08G 77/16 | (2006.01) | |
| B29K 83/00 | (2006.01) | |
| B29K 105/00 | (2006.01) | |

(52) U.S. Cl.
CPC .......... *C08L 83/08* (2013.01); *B29C 35/0805* (2013.01); *B29C 43/30* (2013.01); *B29C 43/305* (2013.01); *C08G 75/045* (2013.01); *C08G 81/00* (2013.01); *C08J 5/18* (2013.01); *C08K 5/0025* (2013.01); *C08L 83/00* (2013.01); *C09J 183/04* (2013.01); *B29C 2035/0827* (2013.01); *B29K 2083/00* (2013.01); *B29K 2105/0097* (2013.01); *C08G 77/16* (2013.01); *C08G 77/20* (2013.01); *C08G 77/28* (2013.01); *C08J 2383/04* (2013.01); *C08J 2483/08* (2013.01)

(58) Field of Classification Search
CPC ...... C08K 83/00; C08K 83/04; C08K 5/5425; C08K 5/0025; C09J 183/00; C09J 183/04; C09J 183/06; C09J 183/08; C08G 77/28; C08G 77/16
USPC ......................................................... 522/99
See application file for complete search history.

(56) References Cited

U.S. PATENT DOCUMENTS

| | | | |
|---|---|---|---|
| 4,052,529 A | | 10/1977 | Bokerman et al. |
| 4,485,206 A | * | 11/1984 | Inoue ........................ C08K 3/22 524/719 |
| 4,603,168 A | * | 7/1986 | Sasaki ..................... C08L 83/04 522/18 |
| 4,840,693 A | | 6/1989 | Suzuki et al. |
| 4,889,905 A | | 12/1989 | Suzuki |
| 4,892,895 A | * | 1/1990 | Arai ........................ C08L 83/14 522/99 |
| 5,063,102 A | | 11/1991 | Lee et al. |
| 5,179,134 A | * | 1/1993 | Chu ........................ C08G 77/50 522/172 |
| 5,212,211 A | * | 5/1993 | Welch, II ............... C08G 77/50 522/172 |

(Continued)

FOREIGN PATENT DOCUMENTS

| | | |
|---|---|---|
| EP | 0781814 A2 | 7/1997 |
| JP | S52106387 A | 9/1977 |

(Continued)

OTHER PUBLICATIONS

PCT/JP2016/004557 International Search Report dated Nov. 22, 2016, 4 pages.

(Continued)

*Primary Examiner* — Sanza L. McClendon
(74) *Attorney, Agent, or Firm* — Warner Norcross + Judd LLP

(57) ABSTRACT

Disclosed is an active energy ray curable hot melt silicone composition that is non-flowable at 25° C. and has a viscosity of 1,000 Pa·s or less at 100° C. The active energy ray curable hot melt silicone composition comprises: (A) a mixture of (A1) an organopolysiloxane having an aliphatic unsaturated bond-containing organic group and (A2) an organopolysiloxane optionally having an aliphatic unsaturated bond-containing organic group, (B) a compound having at least two mercapto groups in a molecule, and (C) a photoradical initiator. A cured product and a method of making a film are also disclosed.

14 Claims, No Drawings

(56) References Cited

U.S. PATENT DOCUMENTS

| | | | | |
|---|---|---|---|---|
| 5,292,849 | A | * | 3/1994 | Fujioka .................. C08G 77/20 526/279 |
| 5,498,642 | A | * | 3/1996 | Chu ........................ B29C 70/84 522/40 |
| 5,684,113 | A | * | 11/1997 | Nakanishi ............. C09J 183/04 528/30 |
| 5,753,720 | A | * | 5/1998 | Nakanishi ............ C08K 5/5406 522/33 |
| 5,753,770 | A | * | 5/1998 | Breitenbach ............ C01B 15/01 524/58 |
| 6,204,350 | B1 | * | 3/2001 | Liu ........................ C08L 101/10 427/195 |
| 6,828,355 | B1 | * | 12/2004 | Chu ........................ C08L 83/00 522/99 |
| 7,105,584 | B2 | * | 9/2006 | Chambers ................ C08J 3/243 522/99 |
| 8,168,737 | B2 | * | 5/2012 | Alvarez .................. C08G 77/14 525/476 |
| 8,618,233 | B2 | * | 12/2013 | Alvarez .................. C08G 77/50 427/387 |
| 10,208,164 | B2 | * | 2/2019 | Dogen ..................... H01L 23/31 |
| 2002/0013442 | A1 | | 1/2002 | Sherman et al. |
| 2016/0168359 | A1 | | 6/2016 | Kleyer et al. |
| 2016/0194496 | A1 | | 7/2016 | Okawa et al. |

FOREIGN PATENT DOCUMENTS

| | | |
|---|---|---|
| JP | S6429482 A | 1/1989 |
| JP | H03227365 A | 10/1991 |
| JP | 2003029644 A | 1/2003 |
| JP | 2006290960 A | 10/2006 |
| JP | 2007254748 A | 10/2007 |
| JP | 2013253179 A | 12/2013 |
| WO | 2006104236 A1 | 10/2006 |
| WO | WO2015033979 A1 | 3/2017 |

OTHER PUBLICATIONS

English language abstract and machine translation for JP2003029644 (A) extracted from http://worldwide.espacenet.com database on May 1, 2018, 19 pages.

English language abstract and machine translation for JP2006290960 (A) extracted from http://worldwide.espacenet.com database on May 1, 2018, 17 pages.

English language abstract and machine translation for JP2013253179 (A) extracted from http://worldwide.espacenet.com database on May 1, 2018, 34 pages.

* cited by examiner

ACTIVE ENERGY RAY CURABLE HOT MELT SILICONE COMPOSITION, CURED PRODUCT THEREOF, AND METHOD OF PRODUCING FILM

CROSS-REFERENCE TO RELATED APPLICATIONS

This application is the National Stage of International Application No. PCT/JP2016/004557 filed on 12 Oct. 2016, which claims priority to and all advantages of JP Patent Application No. 2015-205945 filed on 19 Oct. 2015, the content of which is hereby incorporated by reference.

TECHNICAL FIELD

The present invention relates to an active energy ray curable hot melt silicone composition, cured product of the composition, and a method of producing a film formed from the cured product.

BACKGROUND ART

Heat curable, moisture curable, or active energy ray curable silicone compositions have been used in a wide range of industrial fields since these silicone compositions cure to form cured products having excellent heat resistance, cold resistance, electrical insulating properties, weather resistance, water repellency, and transparency. In particular, the cured products thereof are less likely to be discolored compared to other organic materials, and the cured products cause less degradation of physical properties. Therefore, the cured products are suitable as optical materials.

In recent years, transparent materials have been used in image display devices, solar cell modules, touchscreens, and the like. For example, in an image display device, use of transparent resins, such as acrylic resins, epoxy resins, urethane resins, and silicone resins, in an intermediate layer arranged in between an image display part and a protective part has been proposed to prevent unevenness of display and lowering of brightness due to light reflection caused in between the image display part and the protective part (see Patent Document 1). As such silicone resins, for example, curable silicone compositions in liquid or film form having a pressure sensitive adhesion have been proposed (see Patent Documents 2 and 3).

The film having pressure sensitive adhesion is produced by coating with a liquid curable silicone composition and then curing; however, there are problems in that a thick film is difficult to produce and that a film having a uniform thickness is difficult to produce.

CITATION LIST

Patent Literature

Patent Document 1: Japanese Unexamined Patent Application Publication No. 2003-029644A
Patent Document 2: Japanese Unexamined Patent Application Publication No. 2006-290960A
Patent Document 3: Japanese Unexamined Patent Application Publication No. 2013-253179A

SUMMARY OF INVENTION

Technical Problem

An object of the present invention is to provide an active energy ray curable hot melt silicone composition that is non-flowable at room temperature, that melts by heating, that can be formed into a desired shape, and that is cured by an active energy ray, such as an ultraviolet ray, while the shape is maintained. Furthermore, another object of the present invention is to provide a cured product having excellent heat resistance and light resistance, and to provide a method of producing a film having such characteristics.

Solution to Problem

The active energy ray curable hot melt silicone composition of the present invention is non-flowable at 25° C. and has a viscosity of 1,000 Pa·s or less at 100° C., and comprises:

(A) 100 parts by mass of an organopolysiloxane mixture containing from 10 to 50% by mass of component (A-1) below and from 50 to 90% by mass of component (A-2) below:

(A-1) an organopolysiloxane represented by the following average unit formula:

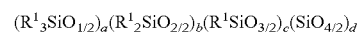

wherein, each $R^1$ is a methyl group, phenyl group, or organic group having an aliphatic unsaturated bond, from 0.01 to 1 mol % of all $R^1$ are the organic groups and 90 mol % or greater of the other $R^1$ are the methyl groups, a is a number from 0 to 0.05, b is a number from 0.9 to 1, c is a number from 0 to 0.03, d is a number from 0 to 0.03, and a total of a to d is 1, (A-2) an organopolysiloxane represented by the following average unit formula:

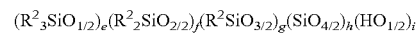

wherein, each $R^2$ is a methyl group, phenyl group, or organic group having an aliphatic unsaturated bond, from 0 to 10 mol % of all $R^2$ are the organic groups and 90 mol % or greater of the other $R^2$ are the methyl groups, e is a number from 0.3 to 0.7, f is a number from 0 to 0.05, g is a number from 0 to 0.05, h is a number from 0.3 to 0.7, i is a number from 0 to 0.05, and a total of e to h is 1;

(B) a compound having at least two mercapto groups in a molecule, in an amount such that an amount of the mercapto group in this component is from 0.5 to 5.0 mol per 1 mol total of the organic group having an aliphatic unsaturated bond in component (A); and (C) a photoradical initiator in an amount that accelerates curing of the composition by an active energy ray.

The organic group having an aliphatic unsaturated bond in component (A) is preferably an alkenyl group, alkenyloxyalkyl group, acryloxyalkyl group, or methacryloxyalkyl group.

Component (B) is preferably an organopolysiloxane having at least two mercapto groups in a molecule.

The present composition preferably further comprises (D) a radical scavenger in an amount of 0.0001 to 1 part by mass per 100 parts by mass total of components (A) to (C).

The present composition preferably further comprises (E) a compound containing at least one type of metal atom selected from the group consisting of V, Ta, Nb, and Ce, in an amount such that the metal atom in this component is from 5 to 2,000 ppm in terms of mass units relative to the total amount of components (A) to (C).

The cured product of the present invention is formed by curing the composition described above, and may be in a film form, and the surface thereof may be adhesive.

The method of producing a film of the present invention comprises: sandwiching the composition described above in between two releasable transparent resin films, forming to a fixed thickness by thermal compression or heating roller, and then irradiating the composition with an active energy ray.

Effect of Invention

The active energy ray curable hot melt silicone composition of the present invention can be formed into a desired shape when being melted by heating, and rapidly cures by irradiating with a high energy ray, such as an ultraviolet ray, while the shape is maintained. Furthermore, the cured product of the present invention exhibits excellent heat resistance and light resistance. Furthermore, the method of producing the film of the present invention can produce a film having a precisely controlled film thickness and having excellent transferability.

DETAILED DESCRIPTION OF THE INVENTION

Active Energy Ray Curable Hot Melt Silicone Composition

Component (A) is a base compound of the present composition and is an organopolysiloxane mixture containing from 10 to 50% by mass of component (A-1) below and from 50 to 90% by mass of component (A-2) below.

Component (A-1) is an organopolysiloxane represented by the following average unit formula:

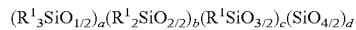

$(R^1_3SiO_{1/2})_a(R^1_2SiO_{2/2})_b(R^1SiO_{3/2})_c(SiO_{4/2})_d$

In the formula, each $R^1$ is a methyl group, phenyl group, or organic group having an aliphatic unsaturated bond. Examples of this organic group include alkenyl groups, such as a vinyl group, allyl group, butenyl group, pentenyl group, and hexenyl group; alkenyloxyalkyl groups, such as an allyloxymethyl group and 3-allyloxypropyl group; acryloxyalkyl groups or methacryloxyalkyl groups, such as a methacryloxymethyl group, 3-methacryloxypropyl group, acryloxymethyl group, and 3-acryloxypropyl group; and nitrogen atom-containing organic groups, such as N-allylamino propyl group, 3-acrylamido propyl group, and 3-methacrylamido propyl group. The organic group is preferably an alkenyl group, alkenyloxyalkyl group, acryloxyalkyl group, or methacryloxyalkyl group. Furthermore, from 0.01 to 1 mol %, and preferably from 0.05 to 0.5 mol %, of all $R^1$ in component (A-1) are the organic groups. This is because curing can be performed sufficiently by irradiating the obtained composition with an active energy ray when the proportion of the organic group is greater than or equal to the lower limit of the range described above, and meanwhile, mechanical strength of the resulting cured product is enhanced when the proportion is less than or equal to the upper limit of the range described above. Furthermore, 90 mol % or greater, and preferably 95 mol % or greater, of $R^1$ other than the organic groups described above are methyl groups. This is because coloration of the cured product is less likely to occur.

In the formula, a is a number from 0 to 0.05, b is a number from 0.9 to 1, c is a number from 0 to 0.03, d is a number from 0 to 0.03, and a total of a to d is 1; and preferably a is a number from 0 to 0.03, b is a number from 0.97 to 1, c is a number from 0 to 0.02, d is a number from 0 to 0.02, and a total of a to d is 1. This is because when a to d are within the range described above, the mechanical strength of the resulting cured product is enhanced.

Examples of component (A-1) include organopolysiloxanes represented by the following average unit formulas. Note that, in the formulas, Me represents a methyl group, Ph represents a phenyl group, Vi represents a vinyl group, and Map represents a 3-methacryloxypropyl group.

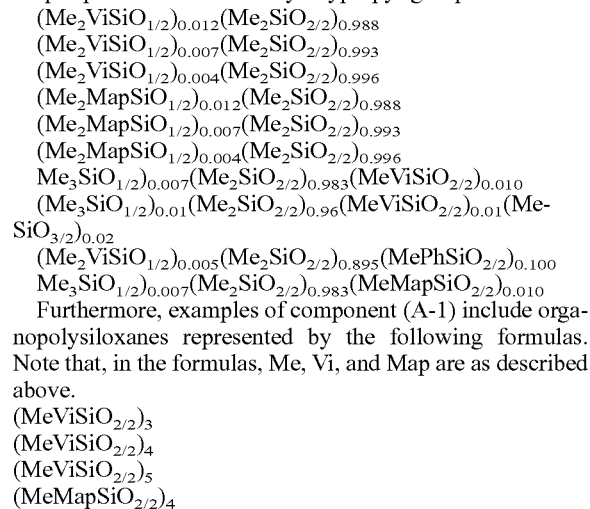

$(Me_2ViSiO_{1/2})_{0.012}(Me_2SiO_{2/2})_{0.988}$
$(Me_2ViSiO_{1/2})_{0.007}(Me_2SiO_{2/2})_{0.993}$
$(Me_2ViSiO_{1/2})_{0.004}(Me_2SiO_{2/2})_{0.996}$
$(Me_2MapSiO_{1/2})_{0.012}(Me_2SiO_{2/2})_{0.988}$
$(Me_2MapSiO_{1/2})_{0.007}(Me_2SiO_{2/2})_{0.993}$
$(Me_2MapSiO_{1/2})_{0.004}(Me_2SiO_{2/2})_{0.996}$
$Me_3SiO_{1/2})_{0.007}(Me_2SiO_{2/2})_{0.983}(MeViSiO_{2/2})_{0.010}$
$(Me_3SiO_{1/2})_{0.01}(Me_2SiO_{2/2})_{0.96}(MeViSiO_{2/2})_{0.01}(MeSiO_{3/2})_{0.02}$
$(Me_2ViSiO_{1/2})_{0.005}(Me_2SiO_{2/2})_{0.895}(MePhSiO_{2/2})_{0.100}$
$Me_3SiO_{1/2})_{0.007}(Me_2SiO_{2/2})_{0.983}(MeMapSiO_{2/2})_{0.010}$

Furthermore, examples of component (A-1) include organopolysiloxanes represented by the following formulas. Note that, in the formulas, Me, Vi, and Map are as described above.

$(MeViSiO_{2/2})_3$
$(MeViSiO_{2/2})_4$
$(MeViSiO_{2/2})_5$
$(MeMapSiO_{2/2})_4$

Component (A-2) is an organopolysiloxane represented by the following average unit formula:

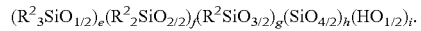

$(R^2_3SiO_{1/2})_e(R^2_2SiO_{2/2})_f(R^2SiO_{3/2})_g(SiO_{4/2})_h(HO_{1/2})_i$.

In the formula, each $R^2$ is a methyl group, phenyl group, or organic group having an aliphatic unsaturated bond. Examples of the organic group include the same organic groups exemplified for $R^1$ above. The organic group is preferably an alkenyl group, alkenyloxyalkyl group, acryloxyalkyl group, or methacryloxyalkyl group. Furthermore, from 0 to 10 mol %, and preferably from 0.05 to 5 mol %, of all $R^2$ in component (A-2) are the organic groups. This is because curing can be performed sufficiently by irradiating the obtained composition with an active energy ray when the proportion of the organic group is greater than or equal to the lower limit of the range described above, and meanwhile, mechanical strength of the resulting cured product is enhanced when the proportion is less than or equal to the upper limit of the range described above. Furthermore, 90 mol % or greater, and preferably 95 mol % or greater, of $R^2$ other than the organic groups described above are methyl groups. This is because coloration of the cured product is less likely to occur.

In the formula, e is a number from 0.3 to 0.7, f is a number from 0 to 0.05, g is a number from 0 to 0.05, h is a number from 0.3 to 0.7, i is a number from 0 to 0.05, and a total of e to h is 1; and preferably e is a number from 0.4 to 0.6, f is a number from 0 to 0.03, g is a number from 0 to 0.03, h is a number from 0 to 0.03, i is a number from 0 to 0.03, and a total of e to h is 1. This is because when e to i are within the range described above, the mechanical strength of the resulting cured product is enhanced.

Examples of component (A-2) include organopolysiloxanes represented by the following average unit formulas. Note that, in the formulas, Me, Ph, Vi, and Map are as described above.

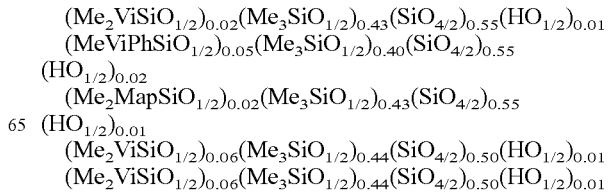

$(Me_2ViSiO_{1/2})_{0.02}(Me_3SiO_{1/2})_{0.43}(SiO_{4/2})_{0.55}(HO_{1/2})_{0.01}$
$(MeViPhSiO_{1/2})_{0.05}(Me_3SiO_{1/2})_{0.40}(SiO_{4/2})_{0.55}(HO_{1/2})_{0.02}$
$(Me_2MapSiO_{1/2})_{0.02}(Me_3SiO_{1/2})_{0.43}(SiO_{4/2})_{0.55}(HO_{1/2})_{0.01}$
$(Me_2ViSiO_{1/2})_{0.06}(Me_3SiO_{1/2})_{0.44}(SiO_{4/2})_{0.50}(HO_{1/2})_{0.01}$
$(Me_2ViSiO_{1/2})_{0.06}(Me_3SiO_{1/2})_{0.44}(SiO_{4/2})_{0.50}(HO_{1/2})_{0.01}$ $(Me_2VISiO_{1/2})_{0.10}(Me_3SiO_{1/2})_{0.40}(SiO_{4/2})_{0.50}(HO_{1/2})_{0.01}$ $(Me_2MapSiO_{1/2})_{0.02}(Me_3SiO_{1/2})_{0.40}(Me_2SiO_{2/2})_{0.05}(SiO_{4/2})_{0.53}(HO_{1/2})_{0.01}$ $(Me_2VISiO_{1/2})_{0.01}(Me_3SiO_{1/2})_{0.44}(PhSiO_{3/2})_{0.05}(SiO_{4/2})_{0.50}(HO_{1/2})_{0.01}$

In component (A), the content of component (A-1) is from 10 to 50% by mass, and preferably from 15 to 45% by mass or from 20 to 40% by mass. This is because, when the content of component (A-1) is within the range described above, excellent hot melt properties of the obtained composition is achieved, and mechanical strength of the resulting cured product is enhanced.

Component (B) is a curing agent of the present composition, and is a compound having at least two mercapto groups in a molecule. Examples of component (B) include o-, m-, or p-xylenedithiol, ethyleneglycol bisthioglycolate, butanediol bisthioglycolate, hexanediol bisthioglycolate, ethyleneglycol bisthiopropionate, butanediol bisthiopropionate, trimethylolpropane tristhiopropionate, pentaerythritol tetrakisthiopropionate, trihydroxyethyl triisocyanuric acid tristhiopropionate, and mercapto group-containing organopolysiloxanes. From the perspective of exhibiting excellent miscibility with component (A) as well as from the perspective of enhancing heat resistance and light resistance of the resulting cured product, a mercapto group-containing organopolysiloxane is preferable. Examples of the mercapto group in this organopolysiloxane include mercaptoalkyl groups, such as a mercaptopropyl group and mercaptobutyl group. Furthermore, examples of the groups other than the mercaptoalkyl group in this organopolysiloxane include alkyl groups, such as a methyl group, ethyl group, and propyl group; aryl groups, such as a phenyl group, tolyl group, and xylyl group; aralkyl groups, such as a benzyl group and phenethyl group.

Examples of the mercapto group-containing organopolysiloxane include straight-chain organopolysiloxanes represented by the following general formula:

$$R^3_3SiO(R^3_2SiO)_mSiR^3_3$$

or cyclic organopolysiloxanes represented by the following general formula:

$$(R^3_2SiO)_n$$

In the formulas, $R^3$ may be the same or different and represent an alkyl group, aryl group, aralkyl group, or mercaptoalkyl group; however, at least two of $R^3$ in a molecule represent the mercaptoalkyl groups. Examples of the alkyl group of $R^3$ include a methyl group, ethyl group, and propyl group. Examples of the aryl group of $R^3$ include a phenyl group, tolyl group, and xylyl group. Examples of the aralkyl group of $R^3$ include a benzyl group and phenethyl group. Furthermore, examples of the mercaptoalkyl group of $R^3$ include a mercaptopropyl group and mercaptobutyl group.

Furthermore, in the formula, m is an integer of 1 or greater, and preferably an integer of 5 to 100 or an integer of 5 to 50. This is because excellent hot melt properties of the obtained composition is achieved, and mechanical strength of the resulting cured product is enhanced.

Furthermore, in the formula, n is an integer of 3 or greater, and preferably an integer of 4 to 20. This is because excellent hot melt properties of the obtained composition is achieved, and mechanical strength of the resulting cured product is enhanced.

Examples of the organopolysiloxane of component (B) include organopolysiloxanes represented by the following formulas. Note that, in the formulas, Me is as described above.

$Me_2(HSC_3H_6)SiO(Me_2SiO)_{10}SiMe_2(C_3H_6SH)$ $[Me(HSC_3H_6)SiO]_4$ $Me_3SiO(Me_2SiO)_5[Me(HSC_3H_6)SiO]_5SiMe_3$

The content of component (B) is an amount so that an amount of the mercapto groups in this component is from 0.5 to 5.0 mol, and preferably from 0.8 to 2.0 mol, per 1 mol of the total of organic groups having an aliphatic unsaturated bond in component (A). This is because curing can be performed sufficiently by irradiating the obtained composition with an active energy ray when the content of component (B) is greater than or equal to the lower limit of the range described above, and meanwhile, mechanical strength of the resulting cured product is enhanced when the content is less than or equal to the upper limit of the range described above.

Component (C) is a photoradical initiator to initiate curing reaction by irradiating the present composition with an active energy ray. Examples of component (C) include acetophenone, propiophenone, benzophenone, 2-hydroxy-2-methylpropiophenone, 2,2-dimethoxy-1,2-diphenylethan-1-one, 1-hydroxycyclohexylphenylketone, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2-methyl-1-(4-methylthiophenyl)-2-morpholinopropan-1-one, 2-benzyl-2-dimethylamino-(4-morpholinophenyl)-butanone-1,2-(dimethylamino)-2-[(4-methylphenyl)methyl]-1-[4-(4-morpholinyl)phenyl]-1-butanone, 2,4,6-trimethylbenzoyl-diphenyl-phosphine oxide, bis(2,4,6-trimethylbenzoyl)-phenylphosphine oxide, 1,2-octanedione, 1-[4-(phenylthio)-2-(O-benzoyloxime)]ethanone, 1-[9-ethyl-6-(2-methylbenzoyl)-9H-carbazol-3-yl]-1-(O-acetyloxime), ethyl-4-dimethylaminobenzoate, 2-ethylhexyl-4-dimethylaminobenzoate, bis(2,6-dimethoxybenzoyl)-2,4,4-trimethyl-pentylphosphine oxide, benzoyl peroxide, cumene peroxide, and mixtures of two or more types of these.

The content of component (C) is an amount that accelerates curing performed by irradiating the present composition with an active energy ray, and is preferably from 0.1 to 15 parts by mass or from 0.1 to 10 parts by mass per 100 parts by mass of the total amount of components (A) and (B). This is because the obtained composition can be cured sufficiently when the content of component (C) is greater than or equal to the lower limit of the range described above, and meanwhile, heat resistance and light resistance of the resulting cured product is enhanced when the content is less than or equal to the upper limit of the range described above.

The present composition may comprise, as an optional component, (D) a radical scavenger and (E) a compound containing at least one type of metal atom selected from the group consisting of V, Ta, Nb, and Ce as long as the object of the present invention is not impaired.

The radical scavenger of component (D) is effective to enhance storage stability of the present composition, and examples thereof include quinones, such as hydroquinone, hydroquinone monomethyl ether, benzoquinone, p-tert-butylcatechol, 2,6-di-tert-butyl-4-methylphenol, and pyrogallol. The content of component (D) is not limited in the present composition, however, the content is preferably from 0.0001 to 1 part by mass per 100 parts by mass of total components (A) to (C).

Examples of the compound containing at least one type of metal atom selected from the group consisting of V, Ta, Nb, and Ce of component (E) include carboxylic acid salts of the metals described above and organopolysiloxanes containing the metal atoms described above, and Ce-containing organopolysiloxanes are preferable. The Ce-containing organopolysiloxane is a substance where Ce is bonded through an oxygen atom to a silicon atom of a straight-chain or branched organopolysiloxane. Examples of the organic group of the silicon atom include alkyl group, aryl group, aralkyl group, and alkenyl group, however, the organic group of the silicon atom is preferably a methyl group or phenyl group. The content of component (E) is not limited, however, the content is preferably an amount so that the metal atom in component (E) is from 5 to 2,000 ppm in terms of mass units relative to the amount of the present composition.

Furthermore, the present composition may comprise an adhesion-imparting agent. Preferred adhesion-imparting agents are organosilicon compounds having at least one alkoxy group bonded to a silicon atom in a molecule. This alkoxy group is exemplified by a methoxy group, an ethoxy group, a propoxy group, a butoxy group, and a methoxyethoxy group; and the methoxy group is particularly preferred. Furthermore, examples of other groups, excluding the alkoxy group bonded to the silicon atom, of the organosilicon compound include halogen-substituted or unsubstituted monovalent hydrocarbon groups, such as an alkyl group, alkenyl group, aryl group, aralkyl group, and halogenated alkyl group; glycidoxyalkyl groups, such as a 3-glycidoxypropyl group and 4-glycidoxybutyl group; epoxycyclohexylalkyl groups, such as a 2-(3,4-epoxycyclohexyl) ethyl group and 3-(3,4-epoxycyclohexyl)propyl group; epoxyalkyl groups, such as a 3,4-epoxybutyl group and 7,8-epoxyoctyl group; acrylic group-containing monovalent organic groups, such as a 3-methacryloxypropyl group; and a hydrogen atom. The organosilicon compound preferably has a group that can react with an alkenyl group or silicon atom-bonded hydrogen atom in the present composition. Specifically, the organosilicon compound preferably has a silicon atom-bonded hydrogen atom or alkenyl group. Moreover, due to the ability to impart good adhesion with respect to various types of substrates, this organosilicon compound preferably has at least one epoxy group-containing monovalent organic group in a molecule. This type of organosilicon compound is exemplified by organosilane compounds, organosiloxane oligomers, and alkyl silicates. Examples of the molecular structure of the organosiloxane oligomer or alkyl silicate include a straight structure, partially branched straight structure, branched chain structure, ring-shaped structure, and net-shaped structure. A straight chain structure, branched chain structure, and net-shaped structure are particularly preferred. Examples of this type of organosilicon compound include silane compounds such as 3-glycidoxypropyltrimethoxysilane, 2-(3,4-epoxycyclohexyl)ethyltrimethoxysilane, and 3-methacryloxypropyltrimethoxysilane; siloxane compounds having at least one of silicon-bonded alkenyl groups and silicon-bonded hydrogen atoms, and at least one silicon-bonded alkoxy group in a molecule; mixtures of a silane compound or siloxane compound having at least one silicon-bonded alkoxy group and a siloxane compound having at least one silicon-bonded hydroxyl group and at least one silicon-bonded alkenyl group in a molecule; and methyl polysilicate, ethyl polysilicate, and epoxy group-containing ethyl polysilicate. The content of the adhesion-imparting agent is not limited, however, the content is preferably in a range of 0.01 to 10 parts by mass per 100 parts by mass of total amount of the present composition.

Furthermore, the present composition may comprise an inorganic filler, such as silica, titanium oxide, glass, alumina, or zinc oxide; an organic resin fine powder of polymethacrylate resin, silicone resin, or the like; as well as a pigment, a fluorescent substance, or the like, as long as the object of the present invention is not impaired.

To form the present composition into a thin film or to coat the present composition in a desired pattern by printing, a solvent may be added in the present composition. The solvent that can be used is not limited as long as the solvent can dissolve the present composition to form a uniform solution. Specific examples thereof include aliphatic hydrocarbons, such as normal hexane, normal pentane, normal octane, isooctane, and decalin; aromatic hydrocarbons, such as toluene, xylene, and mesitylene; ethers, such as diisopropyl ether, dibutyl ether, and tetrahydrofuran; esters, such as ethyl acetate and butyl acetate; and glycol esters, such as propylene glycol monomethylether acetate and dipropylene glycol monomethylether acetate.

The present composition is non-flowable at 25° C. and has a viscosity of 1,000 Pa·s or less, and preferably 500 Pa·s or less, at 100° C. Note that "non-flowable" means not flowing when no load is applied, and indicates the condition at lower than the softening point measured by a testing method for the softening point by the Ring-and-ball method of a hot melt adhesive agent stipulated in JIS K 6863-1994, "Testing methods for the softening point of hot melt adhesives". That is, in order to be non-flowable at 25° C., the softening point needs to be higher than 25° C. This is because excellent shape retention properties are achieved at the temperature if the composition is non-flowable at 25° C. Furthermore, if the melt viscosity at 100° C. is within the range described above, processing into various forms is facilitated.

Since the present composition is non-flowable at 25° C., the present composition can be processed into various forms, and for example, can be made into a sheet having a thickness of 5 μm to 5 mm, powder form, or tablet form.

Examples of the active energy ray used to cure the present composition include an ultraviolet ray, electron beam, and radial ray, and an ultraviolet ray is preferable. Examples of a device that emits the ultraviolet ray include high-pressure mercury lamps, medium-pressure mercury lamps, and ultraviolet LEDs.

Cured Product

The cured product of the present invention is obtained by irradiating the active energy ray curable hot melt silicone composition described above with the active energy ray. Note that a cured product having a form of the composition before curing can be obtained if the irradiation with the active energy ray is performed at a temperature that the present composition does not exhibit flowability.

The form of this cured product is not limited; however, the form is preferably a film form. Furthermore, the surface of the cured product may be adhesive. The cured product having such an adhesive surface can be applied to adhesive films, optical adhesive films, and the like. The adhesion is not particularly limited; however, the peel strength of bonded SUS steel plate measured by the method stipulated in JIS K 6854 is preferably from 1 gf/inch to 10 kgf/inch, and more preferably from 10 gf/inch to 5 kgf/inch.

Method of Producing Film

The method of producing a film of the present invention includes: sandwiching the active energy ray curable hot melt silicone composition described above in between two releasable transparent resin films, forming to a fixed thickness by thermal compression or heating roller, and then irradiating the composition with an active energy ray. The irradiation with active energy ray may be performed through a transparent resin film or the composition may be directly irradiated after the transparent resin film is peeled off.

The releasable transparent resin film that can be used in this method include a resin film in which the releasability is exhibited by itself and a film obtained by adding or applying a releasing agent to a resin film having low releasability. Examples of the resin film having releasability include polyacrylate resin films or polyolefin resin films that are grafted with silicone, and fluorinated polyolefin resin films. Examples of the resin film, to which a releasing agent is added or applied, include polyester resin films and polyolefin resin films.

EXAMPLES

The active energy ray curable hot melt silicone composition, the cured product thereof, and the method of producing a film of the present invention will be described in detail using practical examples and comparative examples. Note that, in the formulas, Me represents a methyl group, Vi represents a vinyl group, and Map represents a 3-methacryloxypropyl group.

Practical Example 1

An active energy ray curable hot melt silicone composition was prepared by mixing, in xylene, 20.0 parts by mass of organopolysiloxane represented by the following average unit formula:

$(Me_2ViSiO_{1/2})_{0.0025}(Me_2SiO_{2/2})_{0.9975}$ 79.5 parts by mass of organopolysiloxane represented by the following average unit formula:

$(Me_3SiO_{1/2})_{0.50}(SiO_{4/2})_{0.50}(HO_{1/2})_{0.01}$ 0.5 parts by mass (an amount so that an amount of 3-mercaptopropyl groups was 0.83 mol per 1 mol of vinyl groups in the organopolysiloxane described above) of 3-mercaptopropyl group-containing organopolysiloxane represented by the following formula:

$Me_3SiO(Me_2SiO)_{29}[Me(HSC_3H_6)SiO]_3SiMe_3$ 0.1 parts by mass of bis(2,4,6-trimethylbenzoyl)-phenylphosphine oxide, and 0.01 parts by mass of 2,6-di-tert-butyl-4-methylphenol until the mixture was uniform, and then removing the xylene by heating under reduced pressure.

This composition was a solid with no flowability at 25° C. and had a viscosity of 270 Pa·s at 100° C. This composition was sandwiched between fluorosilicone-treated polyethylene terephthalate films (FL3-01, manufactured by Takara Inc. Co., Ltd.) having a thickness of 50 μm, and heated and compressed at 130° C. to form a film having a thickness of 500 μm. Thereafter, the film was irradiated through the polyethylene terephthalate film with an ultraviolet ray using a high-pressure mercury lamp in a manner that the ultraviolet radiation dose was 500 mJ/cm² to produce a film-like cured product. The release film was peeled off from one face of the film-like cured product, and this film-like cured product was adhered to an untreated-polyethylene terephthalate film having a thickness of 50 μm. Thereafter, the other release film on the other face was peeled off, and the film-like cured product was adhered to a SUS steel plate.

The peel strength was measured by the method stipulated in JIS K 6854, and the peel strength was 680 gf/25 mm.

Practical Example 2

An active energy ray curable hot melt silicone composition was prepared by mixing, in xylene, 40.0 parts by mass of organopolysiloxane represented by the following average unit formula:

$(Me_2MapSiO_{1/2})_{0.0025}(Me_2SiO_{2/2})_{0.9975}$ 59.1 parts by mass of organopolysiloxane represented by the following average unit formula:

$(Me_3SiO_{1/2})_{0.44}(SiO_{4/2})_{0.56}(HO_{1/2})_{0.01}$ 0.9 parts by mass (an amount so that an amount of 3-mercaptopropyl group was 0.74 mol per 1 mol of 3-methacryloxypropyl groups in the organopolysiloxane described above) of 3-mercaptopropyl group-containing organopolysiloxane represented by the following formula:

$Me_3SiO(Me_2SiO)_{29}[Me(HSC_3H_6)SiO]_3SiMe_3$ 0.1 parts by mass of 2-hydroxy-2-methylpropiophenone, and 0.01 parts by mass of 2,6-di-tert-butyl-4-methylphenol until the mixture was uniform, and then removing the xylene by heating under reduced pressure.

This composition was a solid with no flowability at 25° C. and had a viscosity of 110 Pa·s at 100° C. This composition was sandwiched between fluorosilicone-treated polyethylene terephthalate films (FL3-01, manufactured by Takara Inc. Co., Ltd.) having a thickness of 50 μm, and heated and compressed at 130° C. to form a film having a thickness of 500 μm. Thereafter, the film was irradiated through the polyethylene terephthalate film with an ultraviolet ray using a high-pressure mercury lamp in a manner that the ultraviolet radiation dose was 500 mJ/cm² to produce a film-like cured product. The release film was peeled off from one face of the cured product, and this cured product was adhered to an untreated-polyethylene terephthalate film having a thickness of 50 μm. Thereafter, the other release film on the other face was peeled off, and the cured product was adhered to a SUS steel plate. The peel strength was measured by the method stipulated in JIS K 6854, and the peel strength was 430 gf/25 mm.

Practical Example 3

An active energy ray curable hot melt silicone composition was prepared by mixing, in xylene, 30.0 parts by mass of organopolysiloxane represented by the following average unit formula:

$(Me_2ViSiO_{1/2})_{0.0025}(Me_2SiO_{2/2})_{0.9975}$ 68.0 parts by mass of organopolysiloxane represented by the following average unit formula:

$(Me_2ViSiO_{1/2})_{0.007}(Me_3SiO_{1/2})_{0.433}(SiO_{4/2})_{0.560}(HO_{1/2})_{0.01}$ 2.0 parts by mass (an amount so that an amount of 3-mercaptopropyl groups was 0.86 mol per 1 mol of the total of vinyl groups in the two types of the organopolysiloxanes described above) of 3-mercaptopropyl group-containing organopolysiloxane represented by the following formula:

$Me_3SiO(Me_2SiO)_{20}[Me(HSC_3H_6)SiO]_{10}SiMe_3$ 0.1 parts by mass of 2-hydroxy-2-methylpropiophenone, and 0.01 parts by mass of 2,6-di-tert-butyl-4-methylphenol until the mixture was uniform, and then removing the xylene by heating under reduced pressure.

This composition was a solid with no flowability at 25° C. and had a viscosity of 1100 Pa·s at 100° C. This composition was sandwiched between fluorosilicone-treated polyethylene terephthalate films (FL3-01, manufactured by Takara Inc. Co., Ltd.) having a thickness of 50 μm, and heated and compressed at 130° C. to form a film having a thickness of 500 μm. Thereafter, the film was irradiated through the polyethylene terephthalate film with an ultraviolet ray using a high-pressure mercury lamp in a manner that the ultraviolet radiation dose was 500 mJ/cm² to produce a film-like cured product. The release film was peeled off from one face of the cured product, and this cured product was adhered to an untreated-polyethylene terephthalate film having a thickness of 50 μm. Thereafter, the other release film on the other face was peeled off, and the cured product was adhered to a SUS steel plate. The peel strength was measured by the method stipulated in JIS K 6854, and the peel strength was 1.2 kgf/25 mm.

Practical Example 4

35.0 parts by mass of organopolysiloxane represented by the following average unit formula:

$(Me_2ViSiO_{1/2})_{0.0025}(Me_2SiO_{2/2})_{0.9975}$ 64.4 parts by mass of organopolysiloxane represented by the following average unit formula:

$(Me_3SiO_{1/2})_{0.44}(SiO_{4/2})_{0.56}(HO_{1/2})_{0.01}$ 0.6 parts by mass (an amount so that an amount of 3-mercaptopropyl groups was 1.72 mol per 1 mol of vinyl groups in the organopolysiloxane described above) of 3-mercaptopropyl group-containing organopolysiloxane represented by the following formula:

$Me_3SiO(Me_2SiO)_{20}[Me(HSC_3H_6)SiO]_{10}SiMe_3$ 0.1 parts by mass of 1-hydroxycyclohexylphenylketone, 0.01 parts by mass of 2,6-di-tert-butyl-4-methylphenol, and 25 parts by mass of xylene were mixed until the mixture was uniform.

This solution was applied on a polyethylene terephthalate film having a thickness of 100 μm so that the thickness of the solution layer was 100 μm. The xylene was volatilized in an oven at 110° C. to produce a film having a thickness of 90 μm formed from the active energy ray curable hot melt silicone composition. This film was a solid with no flowability at 25° C. and had a viscosity of 820 Pa·s at 100° C. This film was sandwiched between fluorosilicone-treated polyethylene terephthalate films (FL3-01, manufactured by Takara Inc. Co., Ltd.) having a thickness of 50 μm, and heated and compressed at 130° C. to form the film having a thickness of 500 μm. Thereafter, the film was irradiated through the polyethylene terephthalate film with an ultraviolet ray using a high-pressure mercury lamp in a manner that the ultraviolet radiation dose was 500 mJ/cm² to produce a film-like cured product. The release film was peeled off from one face of the cured product, and this cured product was adhered to an untreated-polyethylene terephthalate film having a thickness of 50 μm. Thereafter, the other release film on the other face was peeled off, and the cured product was adhered to a SUS steel plate. The peel strength was measured by the method stipulated in JIS K 6854, and the peel strength was 780 gf/25 mm.

Practical Example 5

20.0 parts by mass of organopolysiloxane represented by the following average unit formula:

$(Me_2ViSiO_{1/2})_{0.0025}(Me_2SiO_{2/2})_{0.9975}$ 78.0 parts by mass of organopolysiloxane represented by the following average unit formula:

$(Me_2ViSiO_{1/2})_{0.007}(Me_3SiO_{1/2})_{0.503}(SiO_{4/2})_{0.490}(HO_{1/2})_{0.02}$ 2.0 parts by mass (an amount so that an amount of 3-mercaptopropyl groups was 0.79 mol per 1 mol of the total of vinyl groups in the two types of the organopolysiloxanes described above) of 3-mercaptopropyl group-containing organopolysiloxane represented by the following formula:

$Me_3SiO(Me_2SiO)_{20}[Me(HSC_3H_6)SiO]_{10}SiMe_3$ 0.1 parts by mass of 1-hydroxycyclohexylphenylketone, 0.01 parts by mass of 2,6-di-tert-butyl-4-methylphenol, and 25 parts by mass of xylene were mixed until the mixture was uniform.

This solution was applied on a polyethylene terephthalate film having a thickness of 100 μm so that the thickness of the solution layer was 100 μm. The xylene was volatilized in an oven at 110° C. to produce a film having a thickness of 90 μm formed from the active energy ray curable hot melt silicone composition. This film was a solid with no flowability at 25° C. and had a viscosity of 900 Pa·s at 100° C. This film was sandwiched between fluorosilicone-treated polyethylene terephthalate films (FL3-01, manufactured by Takara Inc. Co., Ltd.) having a thickness of 50 μm, and heated and compressed at 130° C. to form the film having a thickness of 500 μm. Thereafter, the film was irradiated through the polyethylene terephthalate film with an ultraviolet ray using a high-pressure mercury lamp in a manner that the ultraviolet radiation dose was 500 mJ/cm² to produce a film-like cured product. The release film was peeled off from one face of the cured product, and this cured product was adhered to an untreated-polyethylene terephthalate film having a thickness of 50 μm. Thereafter, the other release film on the other face was peeled off, and the cured product was adhered to a SUS steel plate. The peel strength was measured by the method stipulated in JIS K 6854, and the peel strength was 1.1 kgf/25 mm.

Practical Example 6

An active energy ray curable hot melt silicone composition was prepared by mixing, in xylene, 32.0 parts by mass of organopolysiloxane represented by the following average unit formula:

$(Me_2ViSiO_{1/2})_{0.0025}(Me_2SiO_{2/2})_{0.9975}$ 66.0 parts by mass of organopolysiloxane represented by the following average unit formula:

$(Me_2ViSiO_{1/2})_{0.007}(Me_3SiO_{1/2})_{0.433}(SiO_{4/2})_{0.560}(HO_{1/2})_{0.01}$ 2.0 parts by mass (an amount so that an amount of 3-mercaptopropyl groups was 0.87 mol per 1 mol of the total of vinyl groups in the two types of the organopolysiloxanes described above) of 3-mercaptopropyl group-containing organopolysiloxane represented by the following formula:

$Me_3SiO(Me_2SiO)_{20}[Me(HSC_3H_6)SiO]_{10}SiMe_3$ 0.1 parts by mass of 2-hydroxy-2-methylpropiophenone, 0.5 parts by mass of cerium-containing dimethylpolysiloxane (content of cerium=0.5% by mass), and 0.01 parts by mass of 2,6-di-tert-butyl-4-methylphenol until the mixture was uniform, and then removing the xylene by heating under reduced pressure.

This composition was a solid with no flowability at 25° C. and had a viscosity of 520 Pa·s at 100° C. This composition was sandwiched between fluorosilicone-treated polyethylene terephthalate films (FL3-01, manufactured by Takara Inc. Co., Ltd.) having a thickness of 50 μm, and heated and compressed at 130° C. to form a film having a thickness of 500 μm. Thereafter, the film was irradiated through the polyethylene terephthalate film with an ultraviolet ray using a high-pressure mercury lamp in a manner that the ultraviolet radiation dose was 500 mJ/cm² to produce a film-like cured product. The release film was peeled off from one face of the cured product, and this cured product was adhered to an untreated-polyethylene terephthalate film having a thickness of 50 μm. Thereafter, the other release film on the other face was peeled off, and the cured product was adhered to a SUS steel plate. The peel strength was measured by the method stipulated in JIS K 6854, and the peel strength was 0.9 kgf/25 mm.

Comparative Example 1

An active energy ray curable silicone composition was prepared by mixing, in xylene, 5.0 parts by mass of organopolysiloxane represented by the following average unit formula:

$(Me_2ViSiO_{1/2})_{0.0025}(Me_2SiO_{2/2})_{0.9975}$ 94.8 parts by mass of organopolysiloxane represented by the following average unit formula:

$(Me_3SiO_{1/2})_{0.50}(SiO_{4/2})_{0.50}(HO_{1/2})_{0.01}$ 0.2 parts by mass (an amount so that an amount of 3-mercaptopropyl groups was 1.33 mol per 1 mol of vinyl groups in the organopolysiloxane described above) of 3-mercaptopropyl group-containing organopolysiloxane represented by the following formula:

$Me_3SiO(Me_2SiO)_{29}[Me(HSC_3H_6)SiO]_3SiMe_3$ 0.1 parts by mass of bis(2,4,6-trimethylbenzoyl)-phenylphosphine oxide, and 0.01 parts by mass of 2,6-di-tert-butyl-4-methylphenol until the mixture was uniform, and then removing the xylene by heating under reduced pressure. This composition was a solid with no flowability at 25° C. and at 100° C., and did not have hot melt properties.

Comparative Example 2

An active energy ray curable silicone composition was prepared by mixing, in xylene, 45.0 parts by mass of organopolysiloxane represented by the following average unit formula:

$(Me_2MapSiO_{1/2})_{0.0025}(Me_2SiO_{2/2})_{0.9975}$ 53.5 parts by mass of organopolysiloxane represented by the following average unit formula:

$(Me_3SiO_{1/2})_{0.44}(SiO_{4/2})_{0.56}(HO_{1/2})_{0.01}$ 1.5 parts by mass (an amount so that an amount of 3-mercaptopropyl groups was 1.10 mol per 1 mol of 3-methacryloxypropyl groups in the organopolysiloxane described above) of 3-mercaptopropyl group-containing organopolysiloxane represented by the following formula:

$Me_3SiO(Me_2SiO)_{29}[Me(HSC_3H_6)SiO]_3SiMe_3$ 0.1 parts by mass of 2-hydroxy-2-methylpropiophenone, and 0.01 parts by mass of 2,6-di-tert-butyl-4-methylphenol until the mixture was uniform, and then removing the xylene by heating under reduced pressure. This composition had a viscosity of 390 Pa·s at 25° C. and a viscosity of 23 Pa·s at 100° C. and did not have hot melt properties.

Comparative Example 3

An active energy ray curable hot melt silicone composition was prepared by mixing, in xylene, 30.0 parts by mass of organopolysiloxane represented by the following average unit formula:

$(Me_2ViSiO_{1/2})_{0.0025}(Me_2SiO_{2/2})_{0.9975}$ 69.7 parts by mass of organopolysiloxane represented by the following average unit formula:

$(Me_2ViSiO_{1/2})_{0.007}(Me_3SiO_{1/2})_{0.433}(SiO_{4/2})_{0.560}(HO_{1/2})_{0.01}$ 0.3 parts by mass (an amount so that an amount of 3-mercaptopropyl groups was 0.13 mol per 1 mol of the total of vinyl groups in the two types of the organopolysiloxanes described above) of 3-mercaptopropyl group-containing organopolysiloxane represented by the following formula:

$Me_3SiO(Me_2SiO)_{20}[Me(HSC_3H_6)SiO]_{10}SiMe_3$ 0.1 parts by mass of 2-hydroxy-2-methylpropiophenone, and 0.01 parts by mass of 2,6-di-tert-butyl-4-methylphenol until the mixture was uniform, and then removing the xylene by heating under reduced pressure.

This composition was a solid with no flowability at 25° C. and had a viscosity of 1100 Pa·s at 100° C. This composition was sandwiched between fluorosilicone-treated polyethylene terephthalate films (FL3-01, manufactured by Takara Inc. Co., Ltd.) having a thickness of 50 μm, and heated and compressed at 130° C. to form a film having a thickness of 500 μm. Thereafter, the film was irradiated through the polyethylene terephthalate film with an ultraviolet ray using a high-pressure mercury lamp in a manner that the ultraviolet radiation dose was 500 mJ/cm². However, a cured product was not obtained and the composition had flowability at 100° C.

Comparative Example 4

35.0 parts by mass of organopolysiloxane represented by the following average unit formula:

$(Me_2ViSiO_{1/2})_{0.0025}(Me_2SiO_{2/2})_{0.9975}$ 64.9 parts by mass of organopolysiloxane represented by the following average unit formula:

$(Me_3SiO_{1/2})_{0.44}(SiO_{4/2})_{0.56}(HO_{1/2})_{0.01}$ 1.8 parts by mass (an amount so that an amount of 3-mercaptopropyl groups was 5.17 mol per 1 mol of vinyl groups in the organopolysiloxane described above) of 3-mercaptopropyl group-containing organopolysiloxane represented by the following formula:

$Me_3SiO(Me_2SiO)_{20}[Me(HSC_3H_6)SiO]_{10}SiMe_3$ 0.1 parts by mass of 1-hydroxycyclohexylphenylketone, 0.01 parts by mass of 2,6-di-tert-butyl-4-methylphenol, and 25 parts by mass of xylene were mixed until the mixture was uniform.

This solution was applied on a polyethylene terephthalate film having a thickness of 100 μm and the thickness of the coated film was 100 μm. The xylene was volatilized in an oven at 110° C. to produce a film having a thickness of 90 μm formed from the active energy ray curable hot melt silicone composition. This film was a solid with no flowability at 25° C. and had a viscosity of 930 Pa·s at 100° C. This film was sandwiched between fluorosilicone-treated polyethylene terephthalate films (FL3-01, manufactured by Takara Inc. Co., Ltd.) having a thickness of 50 μm, and heated and compressed at 130° C. to form a film having a thickness of 500 μm. Thereafter, the film was irradiated through the polyethylene terephthalate film with an ultraviolet ray using a high-pressure mercury lamp in a manner that the ultraviolet radiation dose was 500 mJ/cm². However, a cured product was not obtained and the composition had flowability at 100° C.

INDUSTRIAL APPLICABILITY

Since the active energy ray curable hot melt silicone composition of the present invention is non-flowable at room temperature, melts by heating, can be formed into a desired shape, such as a sheet, and cures when irradiated with an active energy ray, such as an ultraviolet ray, while the shape is maintained, the active energy ray curable hot melt silicone composition is suitable for forming intermediate layers or surface protection layers of image display devices, solar cell modules, touchscreens, and the like. Furthermore, since the cured product of the present invention has excellent heat resistance and light resistance, the cured product is suitable for image display devices, solar cell modules, touchscreens, and the like.

The invention claimed is:

1. An active energy ray curable hot melt silicone composition that is non-flowable at 25° C. and has a viscosity of 1,000 Pa·s or less at 100° C., comprising:
   (A) 100 parts by mass of an organopolysiloxane mixture containing from 10 to 50% by mass of component (A-1) below and from 50 to 90% by mass of component (A-2):
   (A-1) an organopolysiloxane represented by the following average unit formula:

$(R^1_3SiO_{1/2})_a(R^1_2SiO_{2/2})_b(R^1SiO_{3/2})_c(SiO_{4/2})_d$ wherein, each $R^1$ independently is a methyl group, a phenyl group, or an organic group having an aliphatic unsaturated bond, with the proviso that from 0.01 to 1 mol % of all $R^1$ are organic groups having an aliphatic unsaturated bond and 90 mol % or greater of the other $R^1$ are methyl groups, a is a number from 0 to 0.05, b is a number from 0.9 to 1, c is a number from 0 to 0.03, d is a number from 0 to 0.03, and the sum of a to d is 1, (A-2) an organopolysiloxane represented by the following average unit formula:

$(R^2_3SiO_{1/2})_e(R^2_2SiO_{2/2})_f(R^2SiO_{3/2})_g(SiO_{4/2})_h(HO_{1/2})_i$ wherein, each $R^2$ independently is a methyl group, a phenyl group, or an organic group having an aliphatic unsaturated bond, with the proviso that from 0 to 10 mol % of all $R^2$ are organic groups having an aliphatic unsaturated bond and 90 mol % or greater of the other $R^2$ are methyl groups, e is a number from 0.3 to 0.7, f is a number from 0 to 0.05, g is a number from 0 to 0.05, h is a number from 0.3 to 0.7, i is a number from 0 to 0.05, and the sum of e to h is 1;
   (B) a compound having at least two mercapto groups in a molecule, in an amount such that an amount of the mercapto groups in component (B) is from 0.5 to 5.0 mol per 1 mol of the total of the organic groups having an aliphatic unsaturated bond in component (A); and
   (C) a photoradical initiator in an amount that accelerates curing of the composition by an active energy ray.

2. The active energy ray curable hot melt silicone composition according to claim 1, wherein the organic group having an aliphatic unsaturated bond in component (A) is an alkenyl group, an alkenyloxyalkyl group, an acryloxyalkyl group, or a methacryloxyalkyl group.

3. The active energy ray curable hot melt silicone composition according to claim 1, wherein component (B) is an organopolysiloxane having at least two mercapto groups in a molecule.

4. The active energy ray curable hot melt silicone composition according to claim 1, further comprising (D) a radical scavenger in an amount of from 0.0001 to 1 part(s) by mass per 100 parts by mass of the total amount of components (A) to (C).

5. The active energy ray curable hot melt silicone composition according to claim 1, further comprising (E) a compound containing at least one type of metal atom selected from the group consisting of V, Ta, Nb, and Ce in an amount so that the metal atom in this component is from 5 to 2,000 ppm in terms of mass units relative to the total amount of components (A) to (C).

6. A cured product formed by curing the active energy ray curable hot melt silicone composition of claim 1.

7. The cured product according to claim 6, wherein the cured product is in a film form.

8. The cured product according to claim 6, wherein a surface thereof is adhesive.

9. A method of producing a film comprising: sandwiching the active energy ray curable hot melt silicone composition described in claim 1 in between two releasable transparent resin films, forming to a fixed thickness by thermal compression or heating roller, and then irradiating the composition with an active energy ray to produce the film.

10. A film formed in accordance with the method of claim 9.

11. The film according to claim 10 having a thickness of from 5 μm to 5 mm.

12. The cured product according to claim 7 having a thickness of from 5 μm to 5 mm.

13. The active energy ray curable hot melt silicone composition according to claim 5, wherein component (E) comprises an organopolysiloxane containing at least one type of metal atom selected from the group consisting of V, Ta, Nb, and Ce.

14. The cured product according to claim 6 as a layer in an image display device, solar cell module, or touchscreen.

* * * * *